United States Patent
Kim et al.

(10) Patent No.: US 11,259,359 B2
(45) Date of Patent: Feb. 22, 2022

(54) METHOD FOR MANAGING CONNECTION OF UE FOR TRANSMITTING AND RECEIVING V2X MESSAGE IN WIRELESS COMMUNICATION SYSTEM, AND APPARATUS THEREFOR

(71) Applicant: LG ELECTRONICS INC., Seoul (KR)

(72) Inventors: Laeyoung Kim, Seoul (KR); Dongsoo Kim, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 547 days.

(21) Appl. No.: 16/090,558

(22) PCT Filed: Apr. 3, 2017

(86) PCT No.: PCT/KR2017/003620
§ 371 (c)(1),
(2) Date: Oct. 1, 2018

(87) PCT Pub. No.: WO2017/171514
PCT Pub. Date: Oct. 5, 2017

(65) Prior Publication Data
US 2020/0396791 A1    Dec. 17, 2020

Related U.S. Application Data

(60) Provisional application No. 62/316,588, filed on Apr. 1, 2016, provisional application No. 62/317,653, filed on Apr. 4, 2016.

(51) Int. Cl.
*H04W 4/00*   (2018.01)
*H04W 76/34*  (2018.01)
*H04W 76/23*  (2018.01)
*H04W 72/04*  (2009.01)
*H04W 4/40*   (2018.01)

(52) U.S. Cl.
CPC ......... *H04W 76/34* (2018.02); *H04W 72/048* (2013.01); *H04W 76/23* (2018.02); *H04W 4/40* (2018.02)

(58) Field of Classification Search
CPC ... H04W 76/34; H04W 76/23; H04W 72/048; H04W 4/40; H04W 76/30; H04W 92/18
See application file for complete search history.

(56) References Cited

U.S. PATENT DOCUMENTS

| | | | |
|---|---|---|---|
| 9,131,424 B2* | 9/2015 | Xu | H04W 36/0033 |
| 2013/0109301 A1* | 5/2013 | Hakola | H04W 76/14 |
| | | | 455/39 |

(Continued)

FOREIGN PATENT DOCUMENTS

WO    2016035987    3/2016

OTHER PUBLICATIONS

3GPP TS 22.185 V14.0.0 (Mar. 2016) Technical Specification Group Services and System Aspects; Service requirements for V2X services; Stage 1 Release 14 (Year: 2016).*

(Continued)

*Primary Examiner* — Abdelnabi O Musa
(74) *Attorney, Agent, or Firm* — Lee, Hong, Degerman, Kang & Waimey PC

(57) ABSTRACT

A method is disclosed for managing a connection of an UE for transmitting and receiving a V2X message of a first network node in a wireless communication system, the connection management method including the steps of: allowing a first network node to determine that an UE for performing only a PC5 operation will be maintained in the ECM CONNECTED state; and allowing the first network node to transmit information requesting the release of a part of a packet data network (PDN) connection, to a second network node, after the determination.

11 Claims, 14 Drawing Sheets

(56) References Cited

U.S. PATENT DOCUMENTS

| | | | | |
|---|---|---|---|---|
| 2015/0004984 A1* | 1/2015 | Kim | ................. | H04W 4/70 |
| | | | | 455/440 |
| 2015/0105089 A1* | 4/2015 | Zhang | ................. | H04W 76/19 |
| | | | | 455/450 |
| 2015/0271860 A1* | 9/2015 | Baghel | ................. | H04W 4/08 |
| | | | | 455/426.1 |
| 2015/0327327 A1* | 11/2015 | Jain | ................. | H04W 76/36 |
| | | | | 370/328 |
| 2017/0150490 A1* | 5/2017 | Chen | ................. | H04W 76/27 |
| 2018/0152819 A1* | 5/2018 | Pinheiro | ................. | H04W 4/80 |
| 2018/0295655 A1* | 10/2018 | Cavalcanti | ................. | H04W 4/40 |
| 2019/0124489 A1* | 4/2019 | Ahmad | ................. | H04W 4/40 |

OTHER PUBLICATIONS

3GPP TSG-RAN WG2 Meeting #93, R2-162068, St Julian's, Malta, Feb. 15-19, 2016 (Year: 2016).*

Architecture and Protocols for LTE-based Device to Device Communication, 2013 International Conference on Computing, Networking and Communications (ICNC), San Diego, CA, USA, Jan. 28-31, 2013. (Year: 2013).*

European Patent Office Application Serial No. 17775938.8, Search Report dated Aug. 7, 2019, 8 pages.

Alcatel-Lucent, et al., "Commenting contribution on Ericsson's S3-160157 'Security for RRC Connection Suspend and Resume procedure in solution 18 for Narrow Band CIoT'," 3GPP TSG-SA WG3 Meeting #82, S3-160225, XP051060492, Feb. 2016, 8 pages.

PCT International Application No. PCT/KR2017/003620, Written Opinion of the International Searching Authority dated Jun. 27, 2017, 20 pages.

Huawei, "Introduction of NB-IoT", 3GPP TSG RAN WG2 Meeting #93, R2-162068, Feb. 2016, 290 pages.

Zayas, A. D. et al.,"Third-Generation Partnership Project Standards: for Delivery of Critical Communications for Railways", In: IEEE Vehicular Technology Magazine vol. 9 No. 2, May 2014, pp. 58-68, 12 pages.

* cited by examiner

FIG. 10
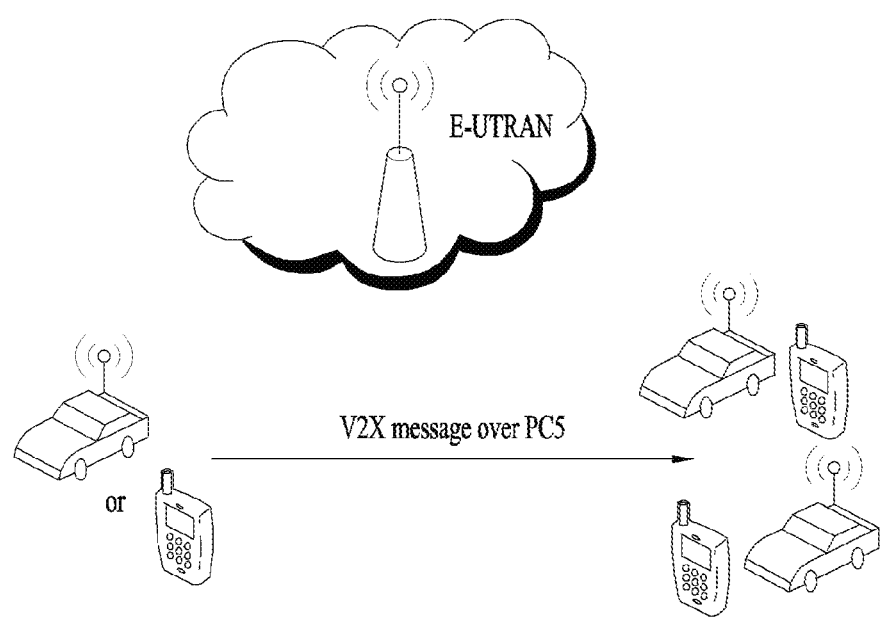
(a)
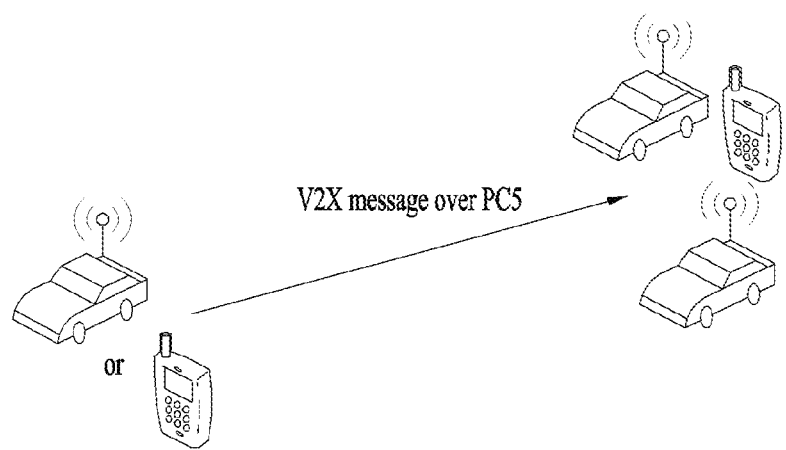
(b)

FIG. 11

| Destination index$_1$ | | LCG ID$_1$ | Buffer Size$_1$ | Oct 1 |
| Buffer Size$_1$ | | Destination index$_1$ | | Oct 2 |
| LCG ID$_2$ | Buffer Size$_2$ | | | Oct 3 |

| Destination index$_{N-1}$ | | LCG ID$_{N-1}$ | Buffer Size$_{N-1}$ | Oct 1.5 * N-2 |
| Buffer Size$_{N-1}$ | | Destination index$_N$ | | Oct 1.5 * N-1 |
| LCG ID$_N$ | Buffer Size$_N$ | | | Oct 1.5 * N |

(a)

| Destination index$_1$ | | LCG ID$_1$ | Buffer Size$_1$ | | | Oct 1 |
| Buffer Size$_1$ | | Destination index$_2$ | | | | Oct 2 |
| LCG ID$_2$ | Buffer Size$_2$ | | | | | Oct 3 |

| Destination index$_N$ | | LCG ID$_N$ | Buffer Size$_N$ | | | Oct 1.5 * N-0.5 |
| Buffer Size$_N$ | | R | R | R | R | Oct 1.5 * N+0.5 |

(b)

METHOD FOR MANAGING CONNECTION OF UE FOR TRANSMITTING AND RECEIVING V2X MESSAGE IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2017/003620, filed on Apr. 3, 2017, which claims the benefit of U.S. Provisional Application No. 62/316,588, filed on Apr. 1, 2016, and 62/317,653, filed on Apr. 4, 2016, the contents of which are all hereby incorporated by reference herein in their entirety.

TECHNICAL FIELD

The following description relates to a wireless communication system and, more particularly, to a connection management method and apparatus of a user equipment (UE) for transmitting and receiving a vehicle-to-everything (V2X) message.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication refers to a communication scheme in which a direct link is established between user equipments (UEs), and voice and data are directly transmitted and received between the UEs without intervention of an evolved Node B (eNB). D2D communication may include UE-to-UE communication and peer-to-peer communication. Further, D2D communication may be applied to machine-to-machine (M2M) communication, and machine type communication (MTC).

D2D communication is considered as a solution to reduce the burden of an eNB, caused by rapidly increasing data traffic. For example, since data is transmitted and received between devices without intervention of an eNB in D2D communication, unlike a legacy wireless communication system, the overhead of the network can be reduced. In addition, it may be expected that the introduction of D2D communication will bring about the effects of simplified procedures in an eNB, reduction of the power consumption of devices participating in D2D communication, increased data rates, increased accommodation capability of a network, load distribution, and extension of cell coverage.

At present, vehicle to everything (V2X) communication is under discussion in conjunction with D2D communication. V2X communication conceptually covers vehicle-to-vehicle (V2V) communication between vehicle terminals, vehicle-to-pedestrian (V2P) communication between a vehicle and another type of terminal, and vehicle to infrastructure (V2I) communication between a vehicle and a roadside unit (RSU).

DETAILED DESCRIPTION OF THE INVENTION

Technical Problems

An object of the present invention is to provide a method of efficiently managing a connection of V2X UEs performing only a PC5 operation.

It will be appreciated by persons skilled in the art that the objects that could be achieved with the present disclosure are not limited to what has been particularly described hereinabove and other objects that the present disclosure could achieve will be more clearly understood from the following detailed description.

Technical Solutions

According to an aspect of the present invention, provided herein is a method of managing a connection of a user equipment (UE) for transmitting and receiving a vehicle-to-everything (V2X) message of a first network node in a wireless communication system, including determining, by the first network node, that a UE performing only a PC5 operation should maintain an ECM_CONNECTED state; and transmitting, by the first network node, information requesting that a part of a packet data network (PDN) connection be released to a second network node, after the determination.

In another aspect of the present invention, provided herein is a first network node for managing a connection of a user equipment (UE) for transmitting and receiving a vehicle-to-everything (V2X) message in a wireless communication system, including a transceiver; and a processor, wherein the processor determines that a UE performing only a PC5 operation should maintain an ECM_CONNECTED state, and transmits, through the transceiver, information requesting that a part of a packet data network (PDN) connection be released to a second network node.

The part of the PDN connection may be an S1 bearer.

The information requesting that the part of the PDN connection be released may be a release access bearers request message.

The first network node may receive a release access bearers response message from the second network node that deletes information of the UE about an evolved node B (eNB) after transmitting the release access bearers request message.

The method may further include receiving, by the first network node, an S1 UE context release request message, from an evolved node B (eNB) that has recognized that the UE performs only the PC5 operation.

The eNB may recognize that the UE performs only the PC5 operation, based on one or more of information indicating that the UE is to receive a V2X service, information indicating that the UE is to perform direct communication, information indicating that the UE is a vehicle UE, information indicating that the UE does not require an S1 bearer, information indicating that the UE does not use the S1 bearer, and information indicating that the UE has been authorized for a V2X service.

The first network node may transmit an S1 UE context release command message to the eNB as a response to the S1 UE context release request message after receiving the release access bearers response message from the second network node.

The method may further include recognizing, by the first network node, that the UE performs only the PC5 operation.

The first network node may recognize that the UE performs only the PC5 operation by receiving an S1 UE status report message from an evolved node B (eNB).

The S1 UE status report message may be a message indicating that the UE has requested a PC5 resource.

The message indicating that the UE has requested the PC5 resource may be transmitted by the eNB when the eNB acquires one or more of information indicating that the UE is to receive a V2X service, information indicating that the UE is to perform direct communication, information indicating that the UE is a vehicle UE, information indicating that the UE does not require an S1 bearer, information indicating that the UE does not use the S1 bearer, and information indicating that the UE has been authorized for a V2X service.

The first network node may transmit an S1 UE context release command message to the eNB as a response to the S1 UE status report message after receiving a release access bearers response message from the second network node.

The first network node may be a mobility management entity (MME) and the second network node may be a serving gateway (S-GW).

Advantageous Effects

According to the present invention, a connection of UEs can be efficiently managed by preventing unnecessary handover signaling from being generated or transmitted/received by releasing a part of a PDN connection of V2X UEs performing only a PC5 operation.

It will be appreciated by those skilled in the art that the effects that can be achieved through the embodiments of the present disclosure are not limited to those described above and other advantages of the present disclosure will be more clearly understood from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

FIG. 10 illustrates transmission and reception of a V2X message of a V2X UE using PCS.

FIG. 11 illustrates an exemplary buffer status report.

BEST MODE FOR CARRYING OUT THE INVENTION

Figure 1:
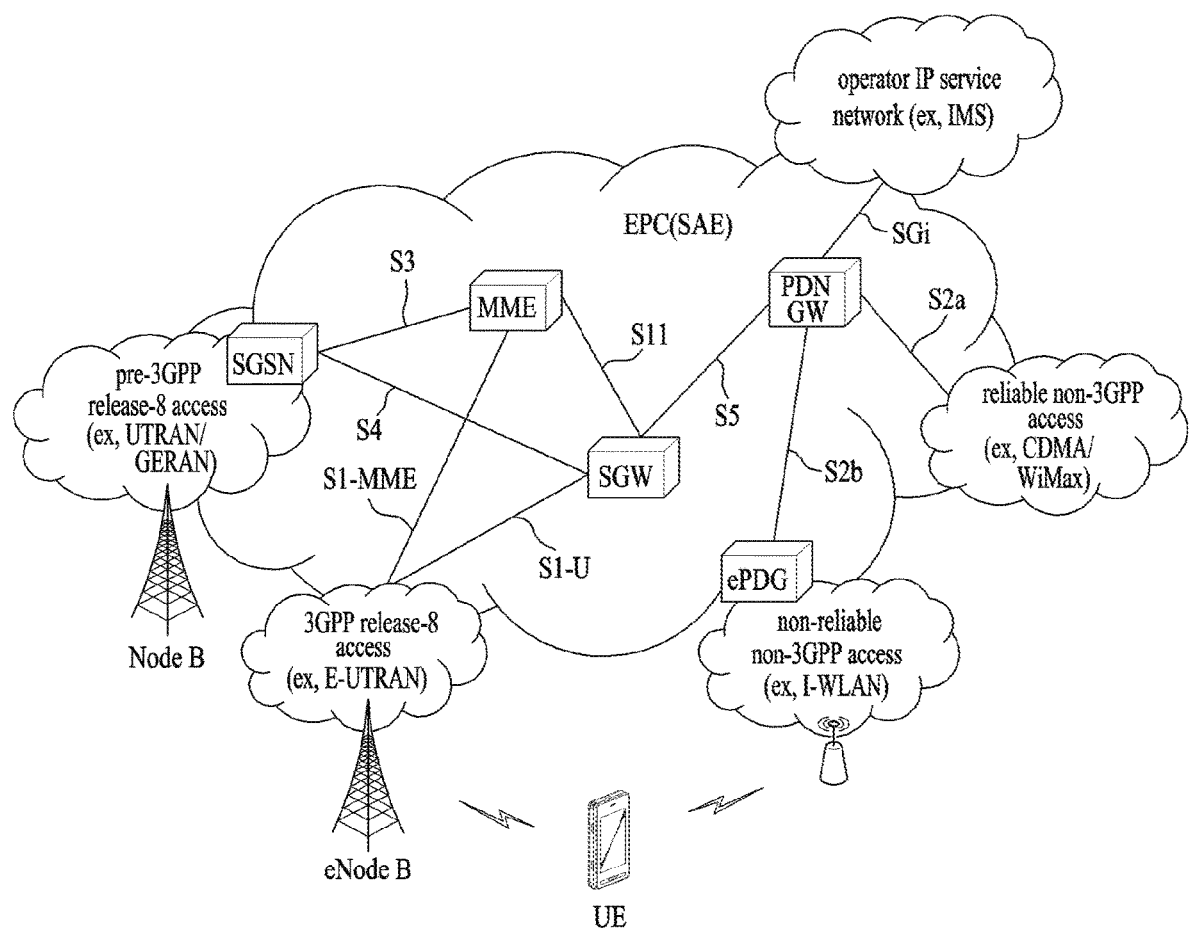
FIG. 1 is a diagram showing a schematic structure of an evolved packet system (EPS).

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
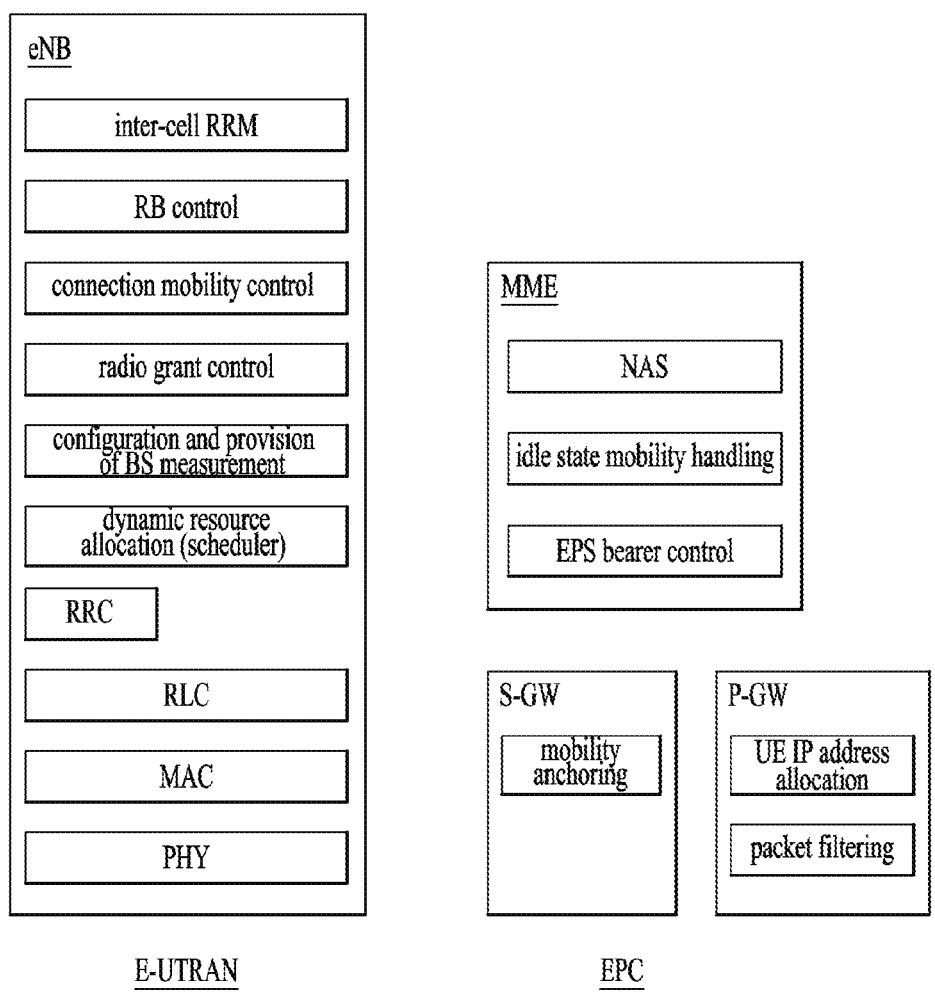
FIG. 2 is an exemplary diagram illustrating an architecture of a general E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
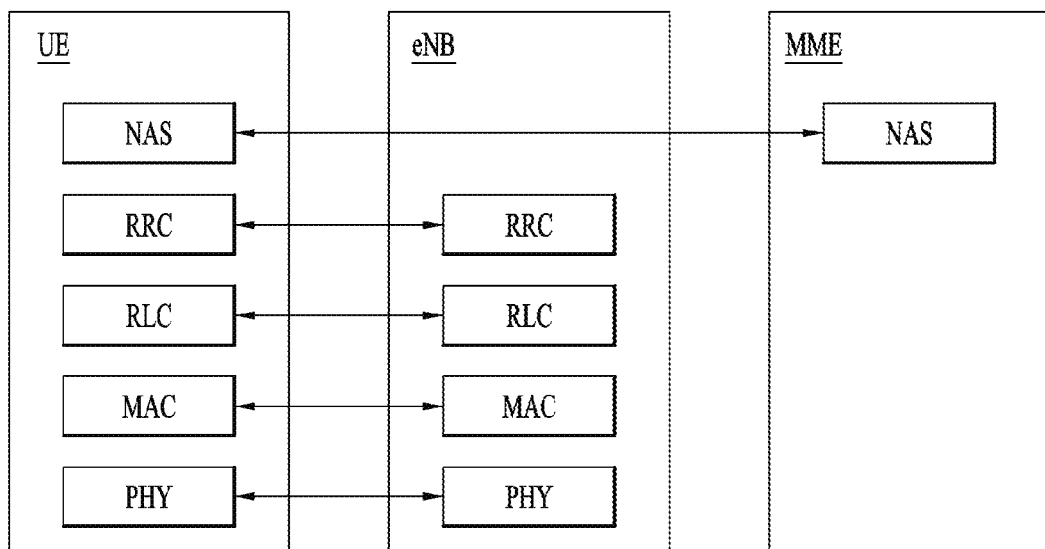
FIG. 3 is an exemplary diagram illustrating a structure of a wireless interface protocol in a control plane.
Figure 4:
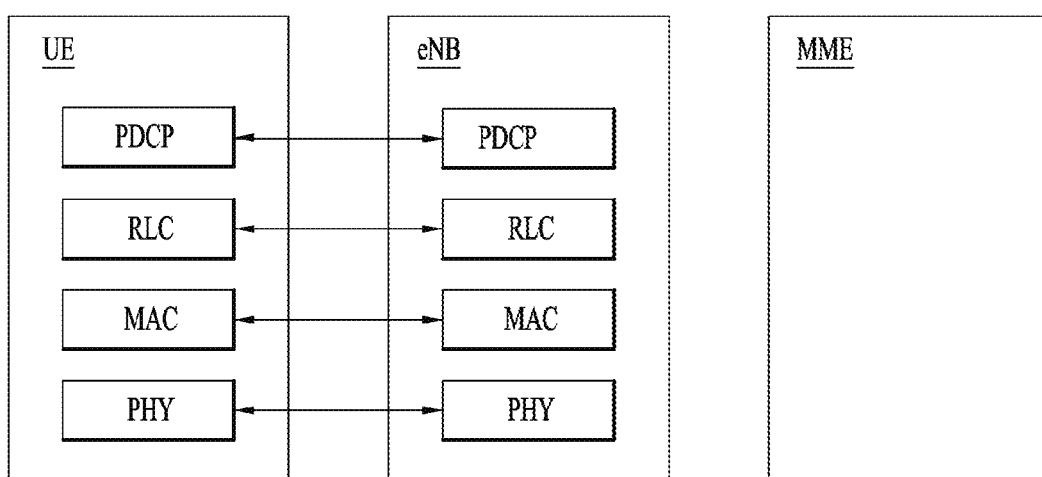
FIG. 4 is an exemplary diagram illustrating a structure of a wireless interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast in a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
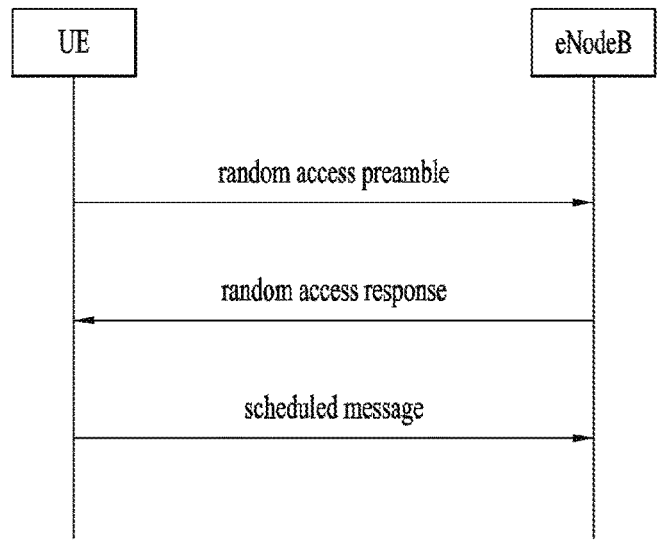
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
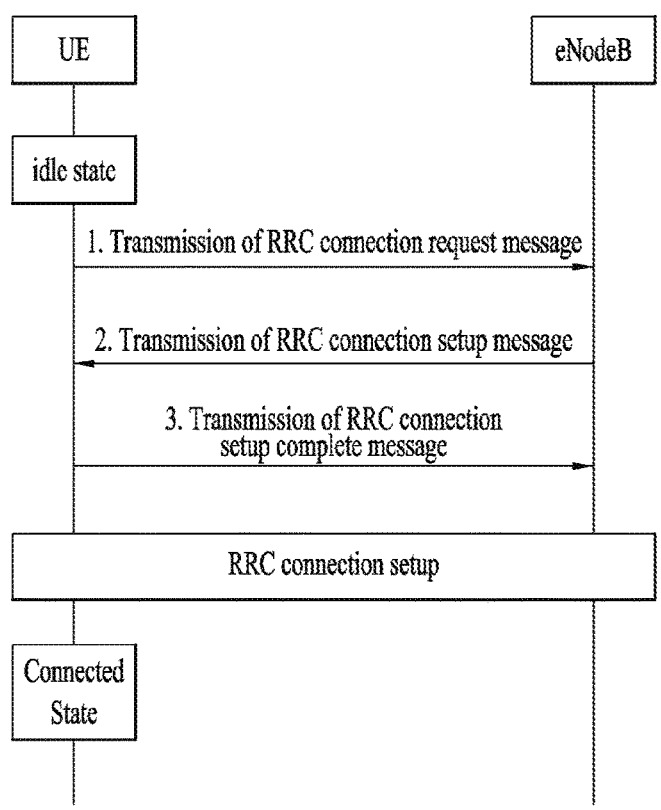
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
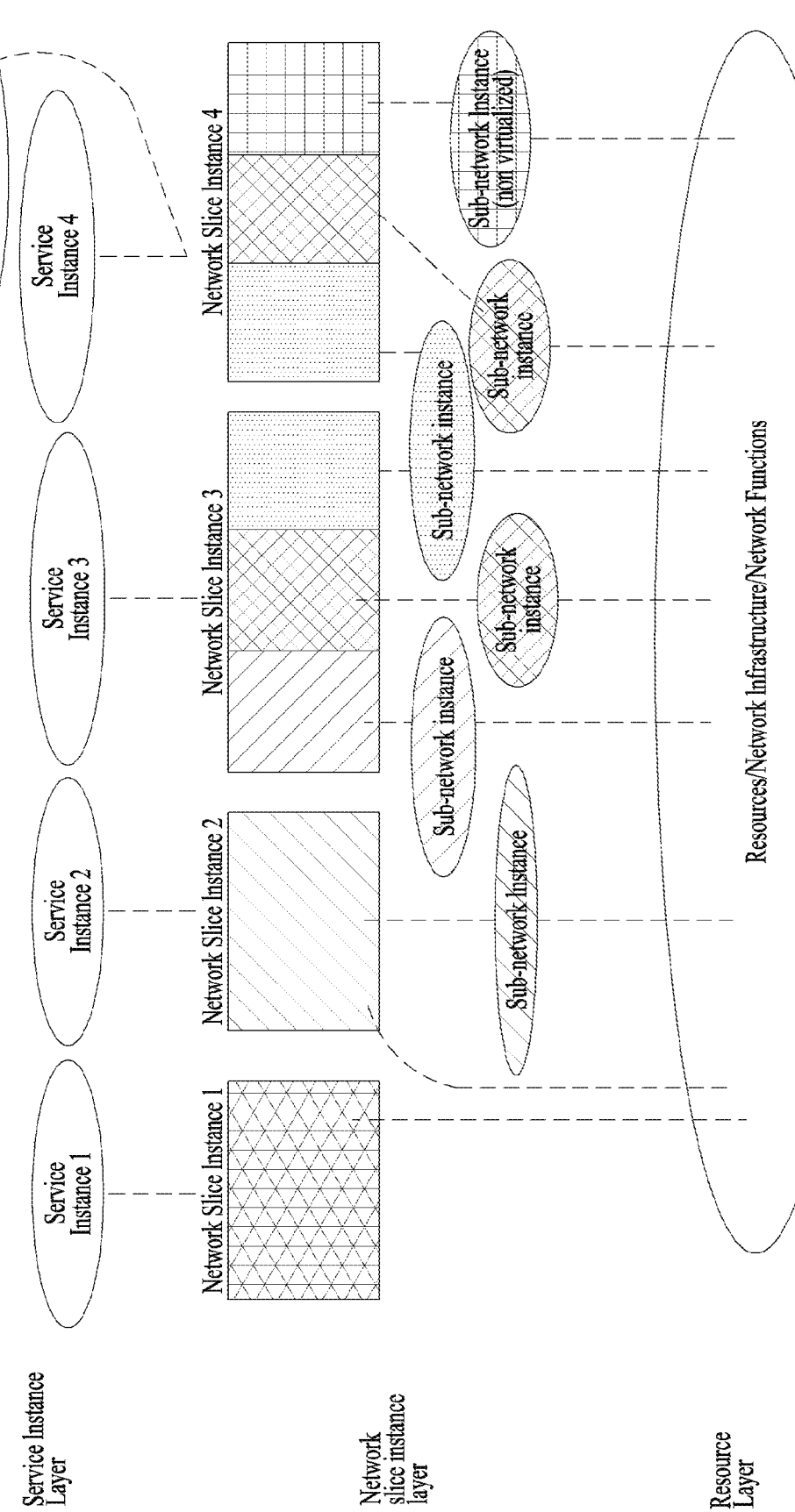
FIG. 7 illustrates the concept of network slicing

In a legacy LTE/LTE-A system, network functions have been performed by an integrated core network, whereas, in a next-generation communication system (e.g., 5G system etc.), introduction of network slicing is under discussion. FIG. 7 illustrates the concept of network slicing. Referring to FIG. 7, the network slicing concept may consist of three layers, i.e., a service instance layer, a network slice instance layer, and a resource layer. The service instance layer represents services (end-user services or business services) to be supported. Each service may be represented by a service instance. Typically, since services may be provided by a network operator or a third party, the service instance may represent an operator service or a third-party provided service. A network slice instance provides network characteristics required by the service instance. The network slice instance may be shared across multiple service instances provided by the network operator. (Other details of network slicing can be found in TR 23.799.) A UE may receive services from one or more network slices illustrated in FIG. 7. The UE may receive services from a plurality of slices.

The UE may simultaneously transmit or receive traffic through multiple slices and may transmit or receive traffic through only one slice at any timing. In the latter case, for example, when the UE receives Service #1 through Slice #1 and receives Service#2 through Slice #2, mobile originated (MO) traffic for Service #1 may be generated and the UE may transmit the MO traffic through Slice #1. As another example, when mobile terminated (MT) traffic for Service #2 is generated in a situation in which there is no traffic that the UE transmits or receives (in a legacy mobile communication system such as an EPS, the UE may be in an IDLE state in this situation), the UE may receive the MT traffic through Slice #2.

Figure 8:
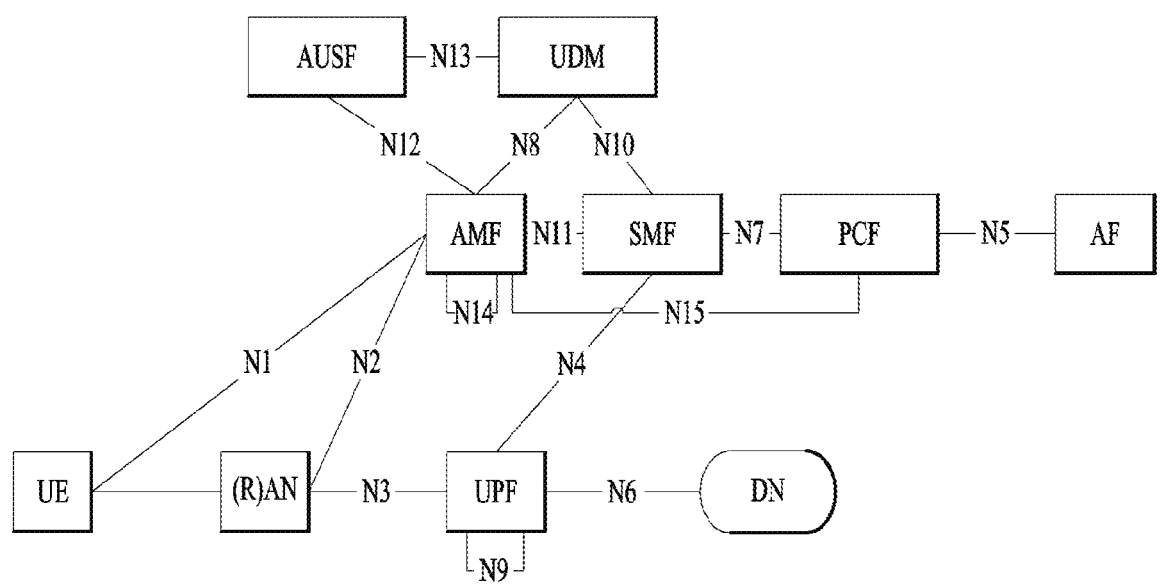
FIG. 8 illustrates an architecture reference model usable in a 5G system.

In a legacy EPC, an MME has been split into a core access and mobility management function (AMF) and a session management function (SMF) in a 5G core network (CN). Therefore, NAS interaction with the UE and mobility management (MM) are performed by the AMF and session management (SM) is performed by the SMF. In addition, the SMF manages a user plane function (UPF), which is a gateway having a user-plane function, that is, a gateway routing user traffic. This may be regarded as the case in which the SMF is in charge of control-plane parts of an S-GW and a PGW and the UPF is in charge of user-plane parts of the S-GW and the P-GW in the legacy EPC. One or more UPFs may be present between a RAN and a data network (DN), for routing of user traffic. Namely, the legacy EPC may be configured as illustrated in FIG. 8 in a 5G system. As a concept corresponding to a PDN connection in a legacy EPS, a protocol data unit (PDU) session has been defined in the 5G system. The PDU session refers to association between the UE and a DN, that provides a PDU connectivity service of Ethernet type or unstructured type as well as IP type. Unified data management (UDM) performs a function corresponding to an HSS of the EPC and a policy control function (PCF) performs a function corresponding to a policy and charging rules function (PCRF) of the EPC. To satisfy requirements of the 5G system, these functions may be extended. Details of a 5G system architecture, each function, and each interface conform to TS 23.501.

Meanwhile, in V2V communication, a cooperative awareness message (CAM) of a periodic message type and a decentralized environmental notification message (DENM) of an event-triggered message type may be transmitted. The CAM may include dynamic vehicle status information such as the direction and velocity of a vehicle, static vehicle data such as dimensions of the vehicle, and basic vehicle information such as an external lighting state and a route history of the vehicle. The size of the CAM may be 50 to 300 bytes. The DENM may be a message generated in an abrupt situation such as breakdown of the vehicle and accident. The size of the DENM may be less than 3000 bytes and all vehicles within a transmission range may receive this message. In this case, the DENM may have higher priority than the CAM. Having higher priority may mean that a message having higher priority is preferentially transmitted when messages are simultaneously transmitted or mean that a message having higher priority among multiple messages is preferentially transmitted in time, in terms of one UE. In terms of multiple UEs, a message having high priority may be intended to be subjected to less interference as compared with a message having low priority so as to lower a reception error probability. Even in the CAM, a CAM having security overhead may have a larger message size than a CAM having no security overhead.

Messages for V2X services include a message periodically transmitted by the UE and a message transmitted when a specific event occurs. The use cases and characteristics of the message can be found in TR 22.885. In addition, various use cases related to ITS and details of V2X message transmission have been defined in ETSI. Tables 2 and 3 below show a summary thereof (3GPP S1-150140). Details can be found in ETSI TS 302 637-2, TS 302 637-3, and TR 102 638.

TABLE 2

| ETSI ITS Message Category | Message Name | Message Type CAM | TX Mode | MIN Frequency (Hz) | MAX Latency (ms) | From | To |
|---|---|---|---|---|---|---|---|
| Vehicle type warnings | Emergency Vehicle Warning | CAM | Broadcast | 10 | 100 | V | V |
| | Slow Vehicle Indication | CAM | Broadcast | 2 | 100 | V | V |
| | Motorcycle Approaching Indication | CAM | Broadcast | 2 | 100 | V | V/I |
| | Vulnerable road user Warning | CAM | Broadcast | 1 | 100 | I/P | V |
| Dynamic vehicle warnings | Overtaking vehicle warning | CAM | Broadcast | 10 | 100 | V | V |
| | Lane change assistance | CAM | Broadcast | 10 | 100 | V | V |
| | Co-operative glare reduction | CAM | Broadcast | 2 | 100 | V | V |
| Collision Risk Warning | Across traffic turn collision risk warning | CAM | Broadcast | 10 | 100 | V | V |
| | Merging Traffic Turn Collision Risk Warning | CAM | Broadcast | 10 | 100 | V | V |
| Others | Co-operative merging assistance | CAM | Broadcast | 10 | 100 | V | V/I |
| | Intersection Collision Warning | CAM | Broadcast | 10 | 100 | V | V |
| | Traffic light optimal speed advisory | CAM | Broadcast | 2 | 100 | I | V |
| | Traffic information and recommended itinerary | CAM | Broadcast | 1~10 | 500 | I | V |
| | Enhanced route guidance and navigation(RSU Capability) | CAM | Broadcast | 1 | 500 | I | V |
| | Intersection management | CAM | Broadcast | 1 | 500 | I | V |
| | Co-operative flexible lane change | CAM | Broadcast | 1 | 500 | I | V |
| | Limited access warning, detour notification | CAM | Broadcast | 1~10 | 500 | I | V |
| | In-vehicle signage | CAM | Broadcast | 1 | 500 | I | V |
| | Electronic toll collect | CAM | Broadcast | 1 | 200 | I | V |
| | Point of interest notification | CAM | Broadcast | 1 | 500 | I | V |
| | Automatic access control/parking access | CAM | Broadcast | 1 | 500 | I | V |
| | Local electronic commerce | CAM | Broadcast | 1 | 500 | I | V |
| | Car rental/sharing assignment/reporting | CAM | Broadcast | 1 | 500 | I | V |
| | Media downloading | CAM | Broadcast | 1 | 500 | I | V |
| | Map download and update | CAM | Broadcast | 1 | 500 | I | V |
| | Ecological/economical drive | CAM | Broadcast | 1 | 500 | I | V |
| | Instant messaging | CAM | Broadcast | 1 | 500 | I | V |
| | Personal data synchronization | CAM | Broadcast | 1 | 500 | I | V |
| | SOS service | CAM | Broadcast | 1 | 500 | I | V |
| | Stolen vehicle alert | CAM | Broadcast | 1 | 500 | I | V |
| | Remote diagnosis and just in time repair notification | CAM | Broadcast | 1 | 500 | I | V |
| | Vehicle relation management | CAM | Broadcast | 1 | 500 | I | V |
| | Vehicle data collect for product life cycle management | CAM | Broadcast | 1 | 500 | I | V |
| | Insurance and financial Services | CAM | Broadcast | 1 | 500 | I | V |
| | Fleet management | CAM | Broadcast | 1 | 500 | I | V |
| | Vehicle software/data provisioning and update | CAM | Broadcast | 1 | 500 | I | V |
| | Loading zone management | CAM | Broadcast | 1 | 500 | I | V |
| | Vehicle and RSU data calibration | CAM | Broadcast | 1 | 500 | I | V |

TABLE 3

| Message Category | Message Name | Message Type DENM | TX Mode | MIN Frequency (Hz) | MAX Latency (ms) | From | To |
|---|---|---|---|---|---|---|---|
| Vehicle status warnings | Emergency electronic brake lights | DENM | Broadcast | 10 | 100 | V | V/I |
| | Safety function out of normal condition warning | DENM | Broadcast | 10 | 100 | V | V/I |
| Traffic hazard warnings | Wrong way driving warning | DENM | Broadcast | 10 | 100 | V | V/I |
| | Stationary vehicle warning | DENM | Broadcast | 10 | 100 | V | V/I |
| | Signal violation warning | DENM | Broadcast | 10 | 100 | V | V |
| | Roadwork warning | DENM | Broadcast | 2 | 100 | I | V |
| | Collision Risk Warning from RSU | DENM | Broadcast | 10 | 100 | I | V |

Figure 9:
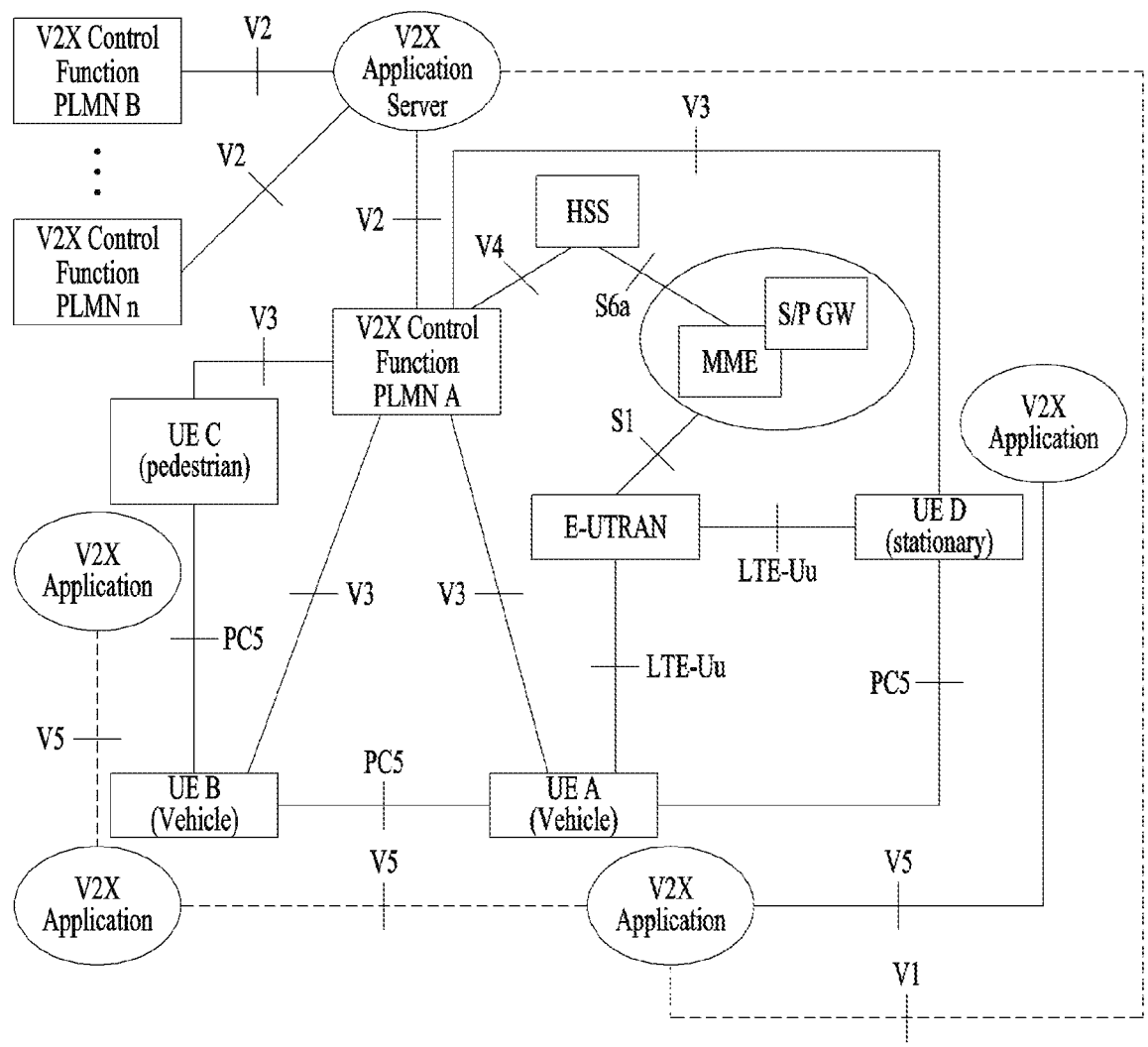
FIG. 9 illustrates an available scenario when a UE receives services from one or more network slices.

FIG. 9 illustrates a PC5 based architecture for V2X services. V1 is a reference point between a V2X application program and a V2X application program server. V2 is a reference point between the V2X application program and a V2X control function in an operator network. The V2X application program may connect to V2X control functions belonging to multiple PLMNs. V3 is a reference point between a V2X enabled UE and the V2X control function in the operator network. V4 is a reference point between an HSS and the V2X control function in the operator network. V5 is a reference point between V2X application programs. LTE-Uu is a reference point between the V2X enabled UE and an E-UTRAN. PC5 is a reference point between V2X enabled UEs for V2V, V2I, and V2P services. Other details can be found in Clause 4.1.1 of TR 23.785v0.2.0.

FIG. 10 illustrates transmission and reception of a V2X message of a V2X UE using PC5. FIG. 10(*a*) illustrates transmission and reception of the V2X message over PC5 when UEs are served by an E-UTRAN and FIG. 10(*b*) transmission and reception of the V2X message over PC5 when the UEs are not served by the E-UTRAN.

Transmission of a V2X message for V2V and V2P services may be performed using PC5. The V2X message over PC5 needs to be broadcast so that all UEs supporting the V2V and/or V2P service in proximity to a UE transmitting the V2X message may receive the message regardless of roaming and a serving PLMN. One-to-all ProSe Direct Communication is applicable when the UE is served by the E-UTRAN and when the UE is not served by the E-UTRAN.

One-to-all ProSe Direct Communication for V2X has the following characteristics.

One-to-all ProSe Direct Communication is connectionless. Thus, there is no signalling over a PC5 control plane.

A radio layer provides a user plane communication service for transmission of IP packets between UEs engaged in Direct Communication.

IPv6 is used for transmission of IP packets of the V2X message.

Authorization for one-to-all ProSe Direct Communication is configured in the UE. Details thereof can be found in Solution #1 of 23.785v0.2.0.

Each UE has a Layer-2 ID for one-to-all ProSe Direct Communication which is included in a source Layer-2 ID field of every frame that the UE sends on a Layer-2 link. The UE self-assigns the Layer-2 ID for one-to-all ProSe Direct Communication. The UE automatically configures a link local IPv6 address according to procedures defined in RFC 4862. This address may be used as a source IP address for one-to-all ProSe Direct Communication.

In order to ensure that a vehicle cannot be tracked or identified by any other vehicle beyond a certain short time period required by an application, the source Layer-2 ID and the source IP address may be changed over time.

To perform one-to-all ProSe Direct Communication, the UE is configured with related information for one-to-all ProSe Direct Communication.

The procedure for one-to-many ProSe Direct Communication transmission described in Clause 5.4.2 of TS 23.303 is applied to one-to-all ProSe Direct Communication for V2X message transmission for V2V/P services using PC5 with the following differences.

The source Layer-2 ID is set to the Layer-2 ID described above.

A destination IP address and a destination Layer-2 ID are set to a well-known broadcast IP address and a well-known Layer-2 ID, respectively.

The procedure for one-to-many ProSe Direct Communication reception described in Clause 5.4.3 of TS 23.303 is applied to one-to-all ProSe Direct Communication for V2X message reception for V2V/P services using PC5.

When a UE operating in mode 1 (i.e., scheduled resource allocation scheme) performs a PC5 operation, the UE transmits a buffer status report (BSR) to an eNB in order to receive a PC5 resource allocated by the eNB. While using the scheduled resource allocation scheme, the UE needs to maintain an RRC_CONNECTED state (i.e., ECM_CONNECTED state). For details thereof, refer to TS 36.300, TS 36.321, etc. For V2X communication, direct communication or sidelink communication of the scheduled resource allocation scheme, which is referred to as mode 3 and is similar to mode 1, has been defined (refer to Clause 23.14.1.1 of TS 36.300 (Support for V2X sidelink communication)).

That is, the following two modes of resource allocation are used for V2X sidelink communication.

The first mode is the scheduled resource allocation scheme (mode 3 sidelink communication). In this mode, the UE needs to be in an RRC_CONNECTED state in order to transmit data. The UE requests that the eNB transmit resources. The eNB schedules transmission resources necessary for sidelink control information and data transmission of the UE.

The second mode is a UE autonomous resource selection scheme (mode 4 sidelink communication). In this mode, the UE selects resources from resource pools and transmits sidelink control information and data. If mapping between V2X sidelink transmission resource pools and zones is configured, the UE selects a V2X sidelink resource pool based on a zone in which the UE is located.

As described above, the UE needs to maintain the RRC_CONNECTED state (i.e., ECM_CONNECTED state) while using the scheduled resource allocation scheme of mode 3. This is because the UE should request that the eNB transmit PC5 resources for sidelink transmission in order to operate in mode 3. To receive the PC5 resources allocated by the eNB, the UE needs to transmit a BSR to the eNB. FIG. 11 illustrates a sidelink BSR and, for details thereof, refer to Clause 6.1.2.1a of TS 36.321 (Sidelink BSR MAC Control Elements) and related contents.

Figure 12:
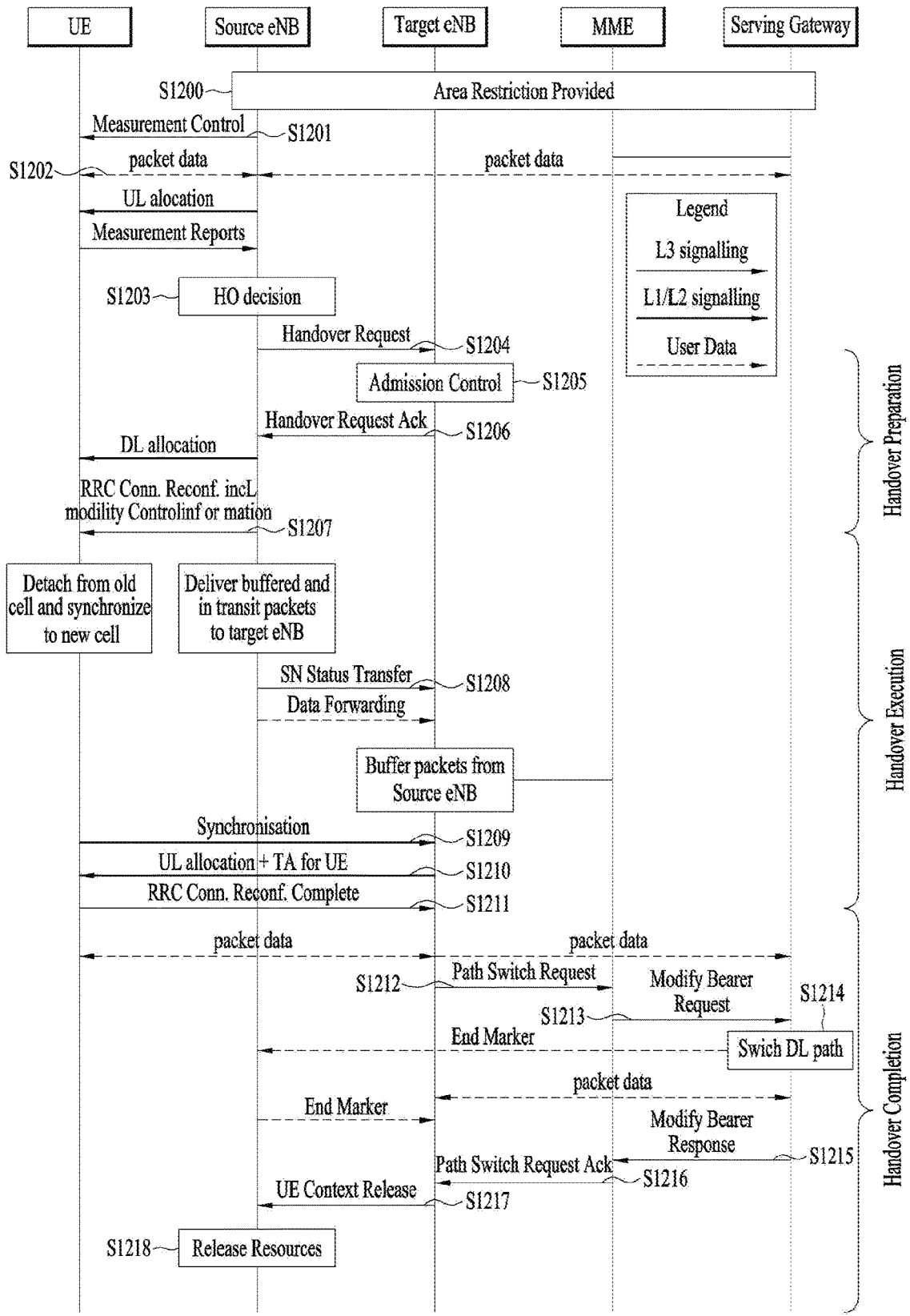
FIG. 12 illustrates a handover procedure.

Upon considering numerous V2X devices operating in an ECM-CONNECTED mode, there may be excessive signaling related to handover in a network, thereby resulting in EPC signaling congestion. However, such signaling may be unnecessary. For example, when the UE transmits and receives only a PC5 based V2X message without data exchange with an application server outside SGi, steps of managing an S1-U (e.g., steps S1212 to 1216 of FIG. 12. Details thereof can be found in a description related to FIG. 10.1.2.1.1-1: Intra-MME/Serving Gateway HO of TS 36.300) are useless and only burden inside a core network is raised. In a current LTE network, signaling burst will be generated by high mobility of PC5 based V2X UEs.

Figure 13:
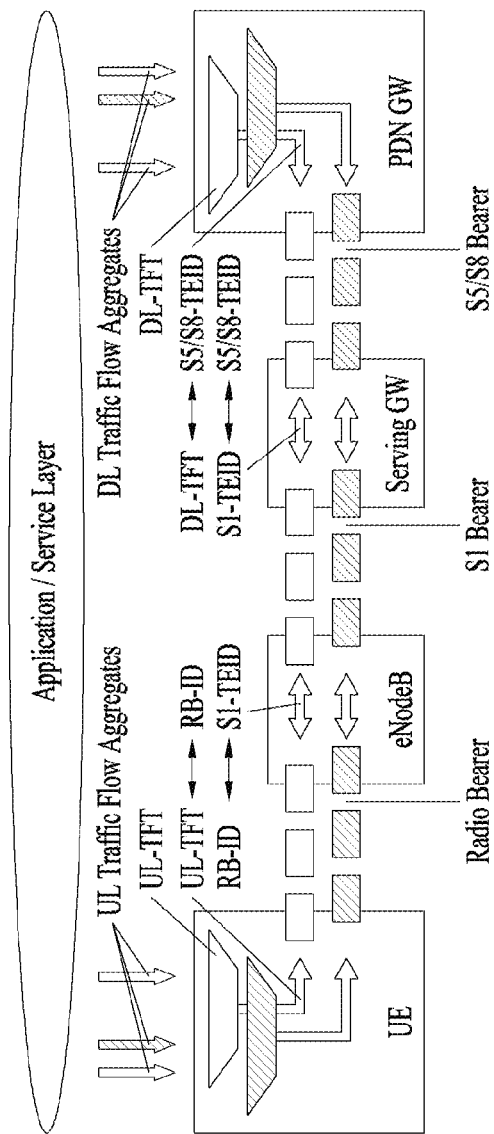
FIG. 13 illustrates the structure of a PDN connection.

FIG. 13 illustrates a PDN connection. Referring to FIG. 13, a UE establishes a PDN connection during data transmission and reception over a network. The PDN connection may actually consist of a combination of data radio bearer(s) (DRB(s)) between the UE and an eNB, S1 bearer(s) between the eNB and an S-GW (i.e., S1-U tunnel), and S5 bearer(s) (i.e. two GWs belong to the same PLMN through an S5 tunnel) to S8 bearer(s) (i.e., two GWs belong to different PLMNs through an S8 tunnel) between the S-GW and a P-GW. If handover occurs, not only should the UE newly generate DRB(s) with a target eNB but also the target eNB should newly generate S1 bearer(s) with the S-GW.

Embodiment 1

Hereinafter, a connection management method of a UE for transmitting and receiving a V2X message according to an embodiment of the present invention will be described based on the above explanation. The following description will be given focusing on a first network node (an MME, or a network node/function performing an MME function in a 5G system) and a second network node (an SGW, or a node/function performing an SGW function in the 5G system).

The first network node may determine that a UE performing only a PC5 operation should maintain an ECM_CONNECTED state and then transmit information requesting that a part of a packet data network (PDN) connection be released to the second network node. A part of the PDN connection is an S1 bearer.

That is, when the UE performs only the PC5 operation, the first network node determines that the UE should maintain the ECM_CONNECTED state. To this end, the first network node requests that the second network node release the S1 bearer. Such a configuration may prevent a congestion situation in which numerous V2X UEs that do not require S1-U management by performing only the above-described PC5 message transmission and reception transmit and receive handover related signaling.

The information requesting that a part of the PDN connection be released may be a Release Access Bearers Request message. After transmitting the Release Access Bearers Request message, the first network node receives a Release Access Bearers Response message from the second network node that deletes information of the UE about an eNB. That is, upon receiving the Release Access Bearers Request message, the second network node deletes a context of the UE for the eNB in order to release the S1 bearer.

In the above description regarding to the case in which the UE performs only the PC5 operation, when the UE performs only the PC5 operation, the eNB or the MME may recognize the operation. The case in which the eNB recognizes that the UE performs only the PC5 operation will now be described first. The eNB recognizes that the UE performs only the PC5 operation, based on one or more of information obtained from the MME, such as information indicating the UE is to receive a V2X service, information indicating that the UE is to perform direct communication, information indicating that the UE is a vehicle UE, information indicating that the UE does not require the S1 bearer, and information indicating that the UE does not use the S1 bearer, and information obtained from the MME such as information indicating that the UE has been authorized for the V2X service. A timing at which the MME provides information to the eNB may be when the UE performs an operation such as attachment, tracking area update (TAU), or service request. In this way, the first network node receives an S1 UE Context Release Request message from the eNB that has recognized that the UE performs only the PC5 operation. After receiving the Release Access Bearers Response message from the second network node, the first network node transmits an S1 UE Context Release Command message to the eNB as a response to the S1 UE Context Release Request message. An additional description that is not given herein and details thereof will be described later in Embodiment 1-1.

Next, the first network node, that is, the MME, may recognize that the UE performs only the PC5 operation. The first network node may recognize that the UE performs only the PC5 operation by receiving an S1 UE Status Report message from the eNB. Herein, the S1 UE Status Report message is a message indicating that the UE has requested a PC5 resource. The message indicating that the UE has requested the PC5 resource is transmitted by the eNB when the eNB acquires one or more of information obtained from the UE, such as information indicating the UE is to receive a V2X service, information indicating that the UE is to perform direct communication, information indicating that the UE is a vehicle UE, information indicating that the UE does not require the S1 bearer, or information indicating that the UE does not use the S1 bearer, and information obtained from the MME such as information indicating that the UE has been authorized for the V2X service. A timing at which the MME provides information to the eNB may be when the UE performs an operation such as attachment, TAU, or service request. Additionally/alternatively, the reason why the eNB transmits the S1 UE Status Report message to the first network node is that the MME has requested that the eNB perform reporting when the UE makes a request for the PC5 resource. After receiving the Release Access Bearers Response message from the second network node, the first network node transmits an S1 UE Context Release Command message to the eNB as a response to the S1 UE Status Report message.

Figure 14:
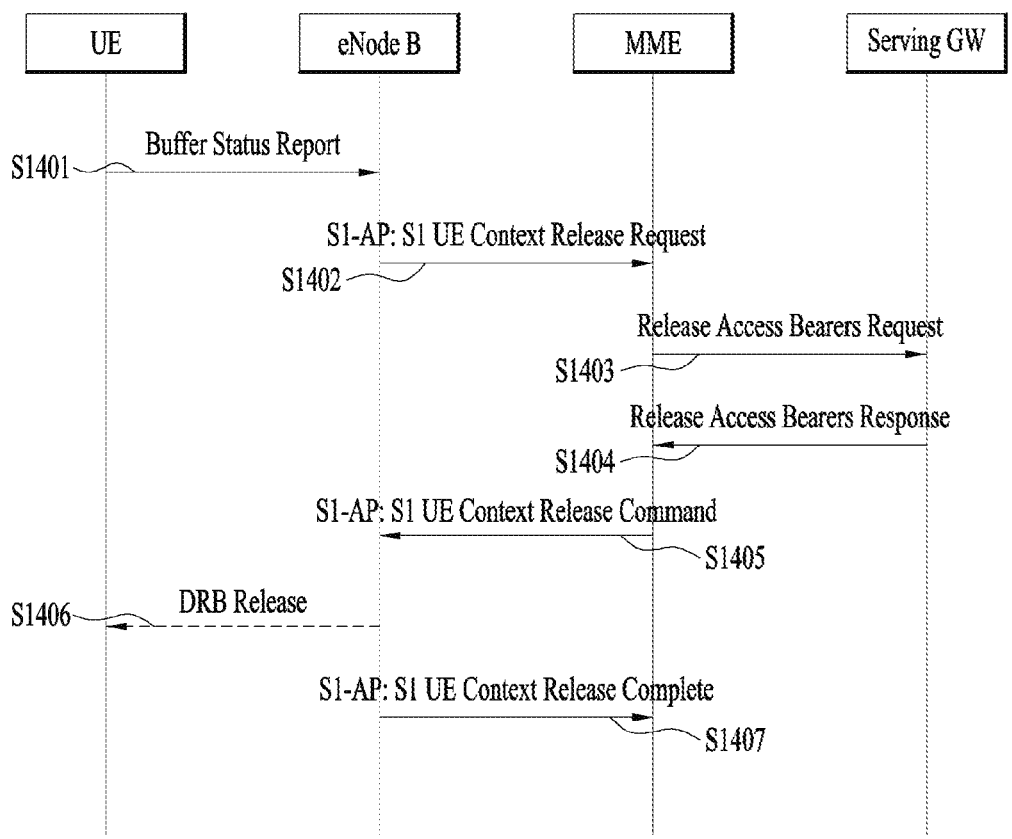
FIGS. 14 and 15 illustrates connection management methods according to each embodiment of the present invention.
Figure 15:
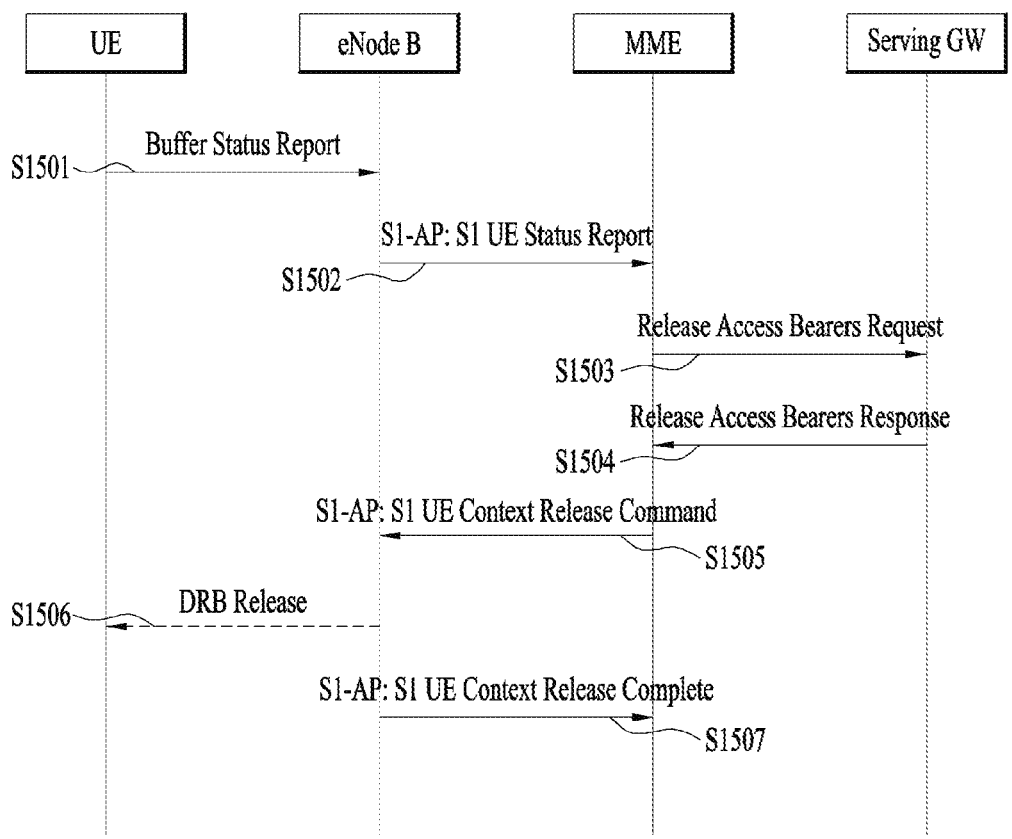

Hereinafter, Embodiments 1-1 and 1-2, which are detailed cases of Embodiment 1, will be described with reference to FIGS. 14 and 15.

Embodiment 1-1

Embodiment 1-1 relates to the case in which the eNB recognizes that the UE performs only the PC5 operation. Referring to FIG. 14, in step S1401, the UE transmits a BSR to the eNB in order to receive a PC5 resource allocated by the eNB. This is because the UE operates in mode 3.

In step S1402, the eNB recognizes that the UE performs only the PC5 operation. This may be interpreted as meaning that the eNB recognizes that the UE need not perform services over a network, that is, traffic transmission/reception over the network, any longer. This may be interpreted as meaning that the eNB recognizes that an S1 bearer (specifically, an S1-U bearer) and/or a DRB for the UE is not needed any longer. Such recognition may be based on one or more of the following information.

i) Information acquired from the UE: This information may be acquired in, for example, step 1401. This information may be information indicating that the UE is to receive a V2X service, the UE desires to perform direct communication, the UE is a vehicle UE, or the UE does not require/use the S1 bearer.

ii) Information acquired from the MME: This information may be acquired from the MME when the UE performs an operation of, for example, attachment, TAU, or service request. This information may be information indicating that the UE has been authorized to provide the V2X service.

According to such recognition, the eNB transmits a message for requesting that the S1 bearer be released to the MME. This message may be used by extending a legacy S1 message as illustrated (S1 UE Context Release Request message) or may be used by defining a new S1 message. The above message serves to release only the S1 bearer between an S-GW and the eNB and cause the UE to maintain an ECM_CONNECTED state. Therefore, when the legacy S1 message is used, information for achieving the above purpose may be explicitly or implicitly included. When the new S1 message is used, the message itself may represent the above purpose or information for achieving the above purpose may be explicitly or implicitly included in the new S1 message. Step 1402 may be performed before or after the eNB allocates the PC5 resource to the UE.

In step S1403, the MME determines that the UE should maintain the ECM_CONNECTED state. To release the S1 bearer, the MME transmits a Release Access Bearers Request message to the S-GW. This message may use a legacy message or include information indicating that the UE is in the ECM_CONNECTED state but the S1 bearer is released.

In step S1404, the S-GW deletes information about the eNB. Then, the S-GW transmits a Release Access Bearers Response message to the MME.

In step S1405, the MME transmits a response message to step 1402 to the eNB. This message may be used by extending the legacy S1 message as illustrated (S1 UE Context Release Command message) or may be used by defining a new S1 message. This message serves to respond to the request received from the eNB through step 1402. If the legacy S1 message is used, information for achieving the above purpose may be explicitly or implicitly included. When the new S1 message is used, the message itself may represent the above purpose or information for achieving the above purpose may be explicitly or implicitly included in the new S1 message.

In step S1406, the eNB may perform an operation of releasing a DRB with respect to the UE (this operation is optional).

In step S1407, the eNB may transmit a confirmation message of step 1405 to the MME (this operation is optional).

This message may be used by extending the legacy S1 message as illustrated or may be used by defining a new S1 message. This message serves to confirm the response received from the MME through Step 1405. If the legacy S1 message is used, information for achieving the above purpose may be explicitly or implicitly included. When the new S1 message is used, the message itself may represent the above purpose or information for achieving the above purpose may be explicitly or implicitly included in the new S1 message.

Embodiment 1-2

Embodiment 1-2 relates to the case in which the MME recognizes that the UE performs only the PC5 operation. Referring to FIG. 15, in step S1501, the UE transmits a BSR to the eNB in order to receive a PC5 resource allocated by the eNB. This is because the UE operates in mode 3.

In step S1502, the eNB transmits a message (e.g., S1 UE Status Report message) indicating that the UE has made a request for the PC5 resource to the MME. As a reason for determination as to why this message is transmitted, one or more of the following information may be used.

i) Information acquired from the UE: This information may be acquired in, for example, step 1501. This information may be information indicating that the UE is to receive a V2X service, the UE is to perform direct communication, the UE is a vehicle UE, or the UE does not require/use an S1 bearer.

ii) Information acquired from an MME: This information may be acquired from the MME when the UE performs an operation of, for example, attachment, TAU, or service request. This information may be information indicating that the UE has been authorized to provide the V2X service. Additionally/alternatively, this information may be used because the MME has requested that the eNB perform reporting when the UE makes a request for the PC5 resource.

The message transmitted to the MME may be used by defining a new S1 message as illustrated (S1 UE Status Report message) or may be used by extending a legacy S1 message. Step 1502 may be performed before or after the eNB allocates the PC5 resource to the UE.

In step S1503, the MME recognizes that the UE performs only the PC5 operation. This may be interpreted as meaning that the MME recognizes that the UE need not perform services over a network, that is, traffic transmission/reception over the network, any longer. This may be interpreted as meaning that the MME recognizes that an S1 bearer (specifically, an S1-U bearer) and/or a DRB for the UE is not needed any longer.

Therefore, the MME determines that the UE should maintain an ECM_CONNECTED state. To release the S1 bearer, the MME transmits a Release Access Bearers Request message to an S-GW. This message may use a legacy message or include information indicating that the UE is in the ECM_CONNECTED state but the S1 bearer is released.

In step S1504, the S-GW deletes information about the eNB and then transmits a Release Access Bearers Response message to the MME.

In step S1505, the MME transmits a message for requesting that the S1 bearer be released or a message indicating that the S1 bearer is released to the eNB. This message may be used by extending the legacy S1 message as illustrated (S1 UE Context Release Command message) or may be used by defining a new S1 message. This message serves to indicate to the eNB that the UE maintains the ECM_CONNECTED state (or RRC_CONNECTED state) but the S1 bearer is released. Additionally/alternatively, this message serves to request that the eNB release the DRB. If the legacy S1 message is used, information for achieving the above purpose may be explicitly or implicitly included. When the new S1 message is used, the message itself may represent the above purpose or information for achieving the above purpose may be explicitly or implicitly included.

In step S1506, the eNB may perform an operation of releasing the DRB with respect to the UE (this operation is optional).

In step S1507, the eNB transmits a response message to step 1505 to the MME. This message may be used by extending the legacy S1 message as illustrated or may be used by defining a new S1 message. This message serves to cause the MME to respond to the request received from the MME through step 1505. If the legacy S1 message is used, information for achieving the above purpose may be explicitly or implicitly included. When the new S1 message is used, the message itself may represent the above purpose or information for achieving the above purpose may be explicitly or implicitly included.

Embodiment 1-3

Embodiment 1-3 is the same as Embodiment 1-1 except that the UE transmits a Sidelink UE Information message, instead of the BSR, in step 1401. Alternatively, the UE may transmit an RRC message or a MAC message, defined for the present invention, instead of the Sidelink UE Information message.

Embodiment 1-4

Embodiment 1-4 is the same as Embodiment 1-2 except that the UE transmits a Sidelink UE Information message, instead of the BSR, in step 1501. Alternatively, the UE may transmit an RRC message or a MAC message, defined for the present invention, instead of the Sidelink UE Information message.

Figure 16:
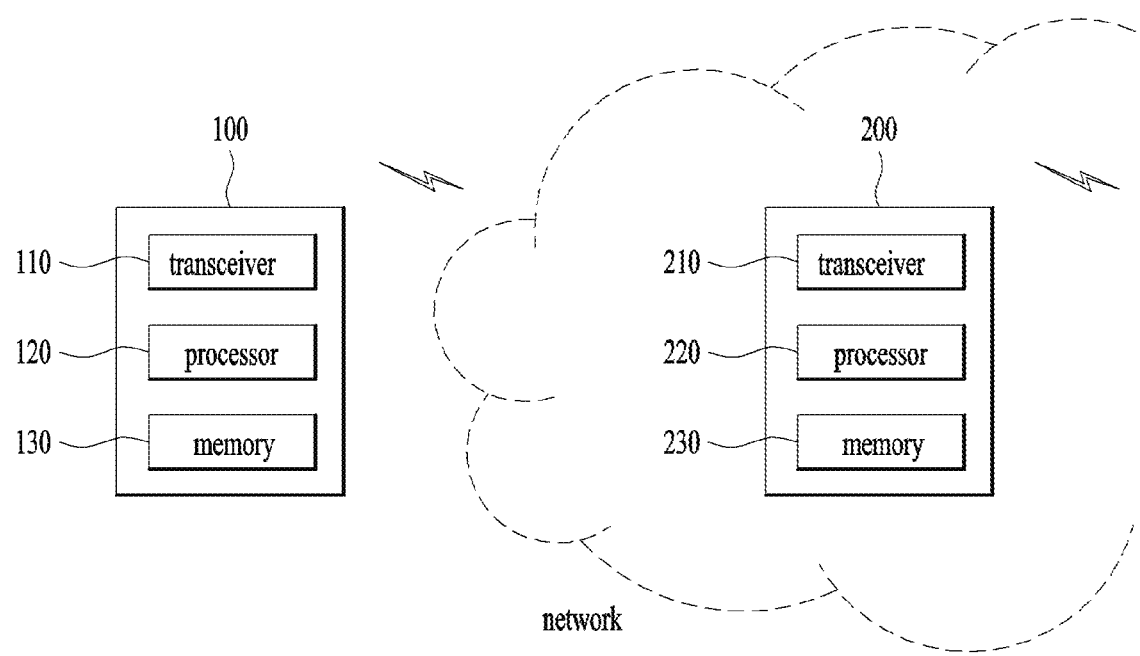
FIG. 16 is a diagram illustrating an exemplary configuration of a node device according to an embodiment of the present invention.

FIG. 16 is a diagram illustrating an exemplary configuration of a UE and a network node according to an embodiment of the present invention.

Referring to FIG. 16, a UE 100 according to the present invention may include a transceiver 110, a processor 120, and a memory 130. The transceiver 110 may be configured to transmit a variety of signals, data, and information to an external device and receive a variety of signals, data, and information from the external device. The UE 100 may be connected to the external device by wire or wirelessly. The processor 120 may control overall operation of the UE 100 and may be configured to perform a function for processing information transmitted from the UE 100 to the external device or from the external device to the UE 100. The memory 130 may store the processed information for a predetermined time and may be replaced by a constituent element such as a buffer (not shown). In addition, the processor 120 may be configured to perform operation of the UE 100 proposed in the present invention.

Referring to FIG. 16, a network node 200 according to the present invention may include a transceiver 210, a processor 220, and a memory 230. The transceiver 210 may be configured to transmit a variety of signals, data, and information to the external device and receive a variety of signals, data, and information from the external device. The network node 200 may be connected to the external device by wire or wirelessly. The processor 220 may control overall operation of the network node 200 and may be configured to perform a function for processing information transmitted from the network node 200 to the external device or from the external device to the network node 200. The memory 230 may store the processed information for a predetermined time and may be replaced by a constituent element such as a buffer (not shown). In addition, the processor 220 may be configured to perform operation of the network node proposed in the present invention. Specifically, the processor 220 may determine that the UE performing only a PC5 operation should maintain an ECM_CONNECTED state and transmit information requesting that a part of a PDN connection be released to a second network node through the transceiver.

For configuration of the UE 100 and the network apparatus, the details described in various embodiments of the present invention may be independently applied or implemented such that two or more embodiments are simultaneously applied. For simplicity, redundant description is omitted.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, and the like.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit and scope of the invention disclosed in the appended claims. Thus, the present invention is not intended to be limited to the embodiments described herein, but is intended to accord with the widest scope corresponding to the principles and novel features disclosed herein.

INDUSTRIAL APPLICABILITY

Although embodiments of the present invention have been described above focusing on the 3GPP system, they are applicable to various mobile communication systems in the same manner.

What is claimed is:

1. A method for a mobility management entity (MME) managing a connection of a user equipment (UE) for transmitting and receiving a vehicle-to-everything (V2X) message in a wireless communication system, the method comprising:
   determining, by the MME, that a UE performing only a proximity service (ProSe) direct communication should maintain an enhanced packet core (EPS) connection management (ECM)_CONNECTED state in an evolved node B (eNB); and
   transmitting, by the MME, information requesting that a part of a packet data network (PDN) connection be released to a serving gateway (S-GW) after the determination,
   wherein the MME recognizes that the UE performs only the ProSe direct communication by receiving an S1 UE status report message via S1-Application Protocol (AP) from the eNB.

2. The method of claim 1, wherein the part of the PDN connection is an S1 bearer.

3. The method of claim 1, wherein the information requesting that the part of the PDN connection be released is a release access bearers request message, and
   wherein the release access bearers request message includes information indicating that the UE is in the ECM_CONNECTED state but the S1 bearer is released.

4. The method of claim 2, wherein the MME receives a release access bearers response message indicating deletion of information of the UE about the eNB from the S-GW in response to the release access bearers request message.

5. The method of claim 4, further comprising receiving, by the MME, an S1 UE context release request message, from the eNB that has recognized that the UE performs only the ProSe direct communication.

6. The method of claim 5, wherein the eNB recognizes that the UE performs only the ProSe direct communication, based on one or more of information indicating that the UE is to receive a V2X service, information indicating that the UE is to perform direct communication, information indicating that the UE is a vehicle UE, information indicating that the UE does not require an S1 bearer, information indicating that the UE does not use the S1 bearer, or information indicating that the UE has been authorized for a V2X service.

7. The method of claim 5, wherein the MME transmits an S1 UE context release command message to the eNB in response to the S1 UE context release request message after receiving the release access bearers response message from the S-GW.

8. The method of claim 1, wherein the S1 UE status report message is a message indicating that the UE has requested a ProSe resource.

9. The method of claim 8, wherein the message indicating that the UE has requested the ProSe resource is transmitted by the eNB based on the eNB acquiring one or more of information indicating that the UE is to receive a V2X service, information indicating that the UE is to perform direct communication, information indicating that the UE is a vehicle UE, information indicating that the UE does not require an S1 bearer, information indicating that the UE does not use the S1 bearer, or information indicating that the UE has been authorized for a V2X service.

10. The method of claim 1, wherein the MME transmits an S1 UE context release command message to the eNB in response to the S1 UE status report message after receiving a release access bearers response message from the S-GW.

11. A mobility management entity (MME) for managing a connection of a user equipment (UE) for transmitting and receiving a vehicle-to-everything (V2X) message in a wireless communication system, the MME comprising:
a transceiver; and
a processor,
wherein the processor determines that a UE performing only a proximity service (ProSe) direct communication should maintain an enhanced packet core (EPS) connection management (ECM)_CONNECTED state in an evolved node B (eNB), and transmits, through the transceiver, information requesting that a part of a packet data network (PDN) connection be released to a serving gateway (S-GW),
wherein the MME recognizes that the UE performs only the ProSe direct communication by receiving an S1 UE status report message via S1-Application Protocol (AP) from the eNB.

\* \* \* \* \*